(12) United States Patent
Karin

(10) Patent No.: US 11,943,246 B2
(45) Date of Patent: *Mar. 26, 2024

(54) RECONSTRUCTING NETWORK ACTIVITY FROM SAMPLED NETWORK DATA USING ARCHETYPAL ANALYSIS

(71) Applicant: Microsoft Technology Licensing, LLC, Redmond, WA (US)

(72) Inventor: Omer Karin, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,356

(22) Filed: May 6, 2022

(65) Prior Publication Data
US 2022/0263848 A1  Aug. 18, 2022

Related U.S. Application Data

(63) Continuation of application No. 16/295,957, filed on Mar. 7, 2019, now Pat. No. 11,356,466.

(51) Int. Cl.
*H04L 9/40* (2022.01)
*G06F 17/16* (2006.01)
(Continued)

(52) U.S. Cl.
CPC .......... *H04L 63/1425* (2013.01); *G06F 17/16* (2013.01); *G06N 20/00* (2019.01);
(Continued)

(58) Field of Classification Search
CPC ... H04L 63/1425; H04L 43/026; H04L 43/04; H04L 43/062; H04L 43/0876; H04L 63/1458; G06N 20/00; G06F 17/16
(Continued)

(56) References Cited

U.S. PATENT DOCUMENTS

| | | | | |
|---|---|---|---|---|
| 8,065,731 | B1 * | 11/2011 | Nucci | H04L 63/1433 713/188 |
| 2010/0054151 | A1 * | 3/2010 | Droz | H04L 43/024 370/253 |

(Continued)

OTHER PUBLICATIONS

Guowu Xie; ReSurf: Reconstructing Web-Surfing Activity om Network Traffic; IEEE 2013; pp. 1-9.*

*Primary Examiner* — Monjur Rahim
(74) *Attorney, Agent, or Firm* — Weaver IP L.L.C.

(57) ABSTRACT

Methods, systems, apparatuses, and computer program products are provided for reconstructing network activity. A network activity monitor is configured to monitor network activity for various network entities. Based on the monitoring, a set of features may be obtained for each network entity. A determination may be made for a number of vertices suitable for describing the sets of features in a multidimensional space. In some implementations, the vertices may define a convex hull in the multidimensional space. Each of the vertices may be assigned a different usage pattern that represents a certain type of network usage types. Reconstructed network activity for a particular network entity may be represented as a weighted combination of the usage patterns. Based on the reconstruction, a network anomaly may be detected, a network may be modified, and/or an alert may be generated.

20 Claims, 6 Drawing Sheets

(51) Int. Cl.
  *G06F 21/55* (2013.01)
  *G06N 20/00* (2019.01)
  *H04L 43/026* (2022.01)
  *H04L 43/04* (2022.01)
  *H04L 43/062* (2022.01)
  *H04L 43/0876* (2022.01)

(52) U.S. Cl.
  CPC ............ *H04L 43/026* (2013.01); *H04L 43/04* (2013.01); *H04L 43/062* (2013.01); *H04L 43/0876* (2013.01); *H04L 63/1458* (2013.01); *H04L 63/1466* (2013.01)

(58) Field of Classification Search
  USPC .......................................................... 726/22
  See application file for complete search history.

(56) References Cited

U.S. PATENT DOCUMENTS

2018/0337935 A1* 11/2018 Marwah ............... H04L 63/1425
2019/0251258 A1*  8/2019 Walters ................... G06F 21/54
2020/0112571 A1*  4/2020 Koral ....................... G06N 3/08
2020/0112574 A1*  4/2020 Koral ..................... G06F 16/245

\* cited by examiner

600

```
                                                                    602
┌─────────────────────────────────────────────────────────────────┐ ╱
│  Determine a number of vertices based on a degree of variance   │
│  between the sets of features and the number of vertices        │
└─────────────────────────────────────────────────────────────────┘
```

```
                                                                    702
┌─────────────────────────────────────────────────────────────────┐ ╱
│ Obtain a set of usage patterns for a network that describes     │
│ sets of features for each of a plurality of network entities,   │
│ each usage pattern in the set corresponding to a different      │
│ vertex in a multidimensional space                              │
└─────────────────────────────────────────────────────────────────┘
```

FIG. 7

RECONSTRUCTING NETWORK ACTIVITY FROM SAMPLED NETWORK DATA USING ARCHETYPAL ANALYSIS

CROSS-REFERENCE TO RELATED APPLICATIONS

This application is a continuation of U.S. patent application Ser. No. 16/295,957, filed Mar. 7, 2019, the entirety which is incorporated by reference herein.

BACKGROUND

Modern cloud-computing platforms include a vast number of network entities that generate large volumes of network traffic. In some instances, cloud-computing platforms may comprise thousands, or even millions, of entities. Due to such a large number of entities, and therefore a large volume of network traffic, the important tasks of monitoring network traffic and maintaining network security have increasingly become challenging to carry out. For instance, monitoring network traffic by logging and analyzing each packet is not practical on many cloud-computing platforms, given the large volume of network traffic.

One solution to address this problem is to obtain sampled network data, such as network flow information in accordance with the Internet Protocol Flow Information Export (IPFIX) protocol. Even where such packet sampling is implemented, however, analyzing the sampled network data to reconstruct network usage is not straightforward. For example, a network or security analyst may need to construct an ad-hoc solution, such as a machine-learning classifier, for each type of network usage (e.g., port scanning), that is trained using labelled data. Based on the ad-hoc solution, a specific type of usage can be inferred from the sampled data.

However, a network or security analyst typically must expend significant time and resources in analyzing sampled network data to obtain meaningful insights as described above. Furthermore, such a solution requires labelled data or expert knowledge such that network usage patterns must be defined or modelled in advance. As a result, network usage patterns typically are not comprehensive, leaving an unknown amount of network activity unexplained, potentially resulting in network attacks being missed or security vulnerabilities being left open.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for reconstructing network activity. A network activity monitor is configured to monitor network activity for various network entities on a network. Based on the monitoring, a set of features may be obtained for each monitored network entity, such as features relating to the type, volume and/or frequency of network traffic associated with the network entity. A determination may be made for a number of vertices suitable for describing the sets of features in a multidimensional space. In some implementations, the vertices may define a convex hull in the multidimensional space. Each of the vertices may be assigned a different usage pattern that represents a certain type of network usage. Network activity for a particular network entity may be reconstructed by obtaining at least some of the features for the particular network entity, and representing the particular network entity as a weighted combination of the usage patterns.

In accordance with implementations described herein, reconstruction of network activity for a particular network entity (or a plurality of network entities) may enable more detailed analytics to be performed across a network. Furthermore, reconstructing network activity in such a manner may enable the detection of a network anomaly, such as a potential or actual network attack, that may be addressed in a number of ways, including but not limited to blocking or filtering network traffic in an appropriate fashion, and/or generating a notification regarding the anomaly.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 6 shows a flowchart of a method for determining a number of vertices based on a degree of variance, according to an example embodiment.

FIG. 7 shows a flowchart of a method for obtaining a set of usage patterns for a network, according to an example embodiment.

Figure 1:
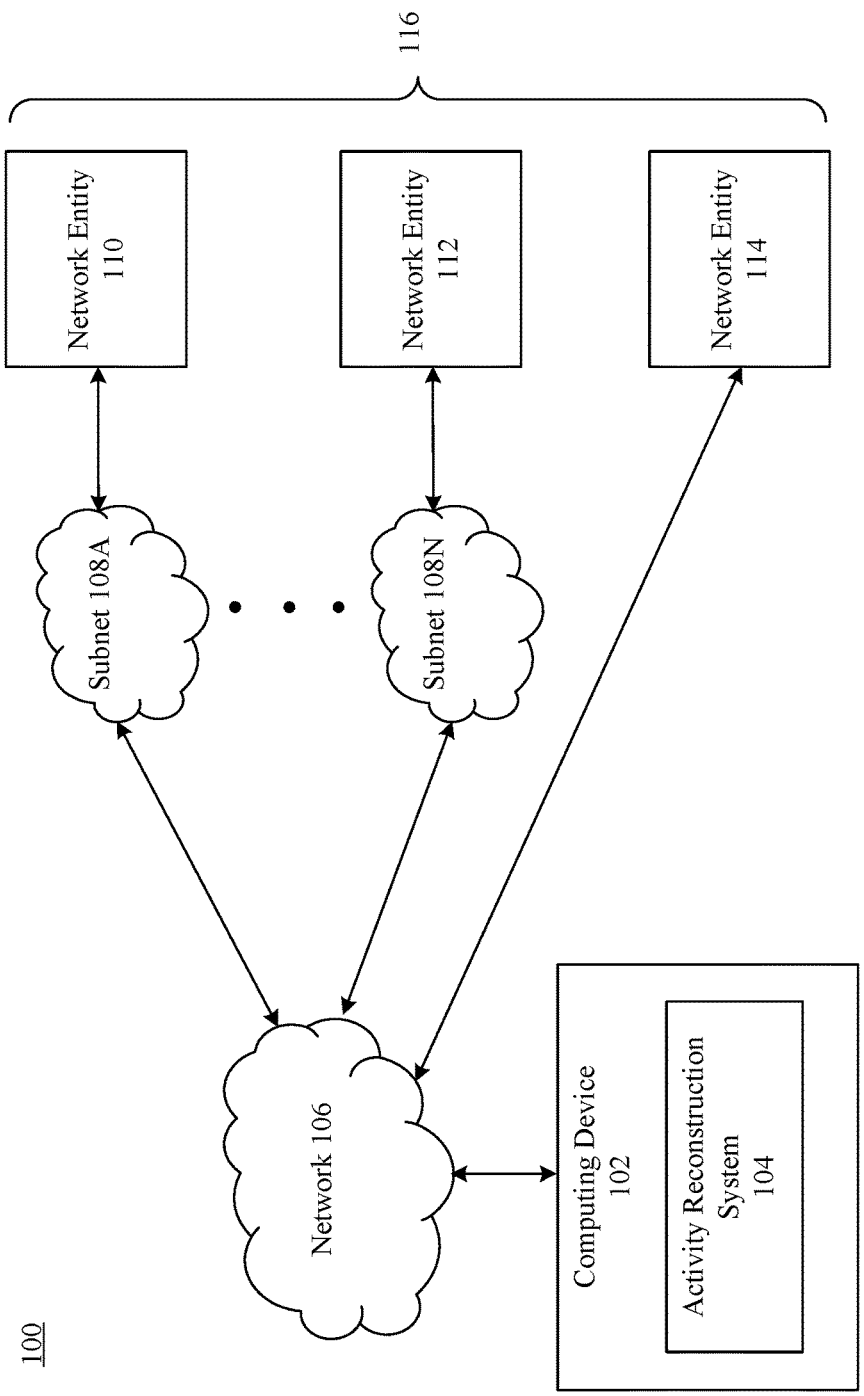
FIG. 1 shows a block diagram of a system for reconstructing network activity, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Modern cloud-computing platforms include a vast number of network entities that generate large volumes of network traffic. In some instances, cloud-computing platforms may comprise thousands, or even millions, of entities. Due to such a large number of entities, and therefore a large volume of network traffic, the important tasks of monitoring network traffic and maintaining network security have increasingly become challenging to carry out. For instance, monitoring network traffic by logging and analyzing each packet is not practical on many cloud-computing platforms, given the large volume of network traffic.

One solution to address this problem is to obtain sampled network data, such as network flow information in accordance with the Internet Protocol Flow Information Export (IPFIX) protocol. Even where such packet sampling is implemented, however, analyzing the sampled network data to reconstruct network usage is not straightforward. For example, a network or security analyst may need to construct an ad-hoc solution, such as a machine-learning classifier, for each type of network usage (e.g., port scanning), that is trained using labelled data. Based on the ad-hoc solution, a specific type of usage can be inferred from the sampled data.

However, a network or security analyst typically must expend significant time and resources in analyzing sampled network data to obtain meaningful insights as described above. Furthermore, such a solution requires labelled data or expert knowledge such that network usage patterns must be defined or modelled in advance. As a result, network usage patterns typically are not comprehensive, leaving an unknown amount of network activity unexplained, potentially resulting in network attacks being missed or security vulnerabilities being left open.

Embodiments described herein address these and other issues by providing a system for reconstructing network activity. In the system, a network activity monitor is configured to monitor network activity of a plurality of network entities across a network. A feature determiner determines sets of features for each of the network entities based on the network activity monitoring, such as features relating to the type, frequency, and/or volume of network activity. A vertex determiner determines a number of vertices that describes the sets of features in a multidimensional space, such as a convex hull. Each of the vertices may be assigned a particular usage pattern that describes the type of network usage. When at least some features for a particular network entity is obtained, the network entity may be represented as a weighted combination of the assigned usage patterns. Such a representation may be used for a number of purposes, including but not limited to network analytics, anomaly detection, alert generation, etc.

Reconstructing network activity in this manner has numerous advantages, including improvement the security of a network and the entities coupled thereto. For example, because a network entity may be represented as a weighted combination of usage patterns or archetypes, it may be determined that the network entity is performing in a manner that is unintended, such as engaging in file transfers, web crawling, etc. In other examples, a weighted combination for a particular entity may include port scanning activity, which may indicate a potential or actual network attack. In yet other examples, if a particular network entity unexpectedly has a reduced amount of certain types of normal usage patterns (e.g., web server activities), it may be determined that a different entity has redirected traffic away from the particular network entity, suggesting that a man-in-the-middle (MITM) attack, or other similar attack, may be occurring. Each type of abnormal or malicious activity may be detected through reconstructing network activity in accordance with implementations, thereby reducing the likelihood of compromising the network, as well as the computers coupled thereto.

Implementations described herein may also provide further improvements to the performance of a network, for instance, by enabling more accurate reconstruction and monitoring of entities coupled to a network. In some examples, based on the network activity reconstruction, network analytics may be performed to determine that network loads may be more appropriately balanced, thereby improving the overall network performance. Furthermore, network activity may be reconstructed in a manner that does not require deploying network monitoring agents at various nodes on a network, thereby reducing the number of resources needed to more accurately model a network.

Example implementations are described as follows that are directed to a system for reconstructing network activity. For instance, FIG. 1 shows a block diagram of an example computing system 100, according to an example embodiment. As shown in FIG. 1, system 100 includes a computing device 102, a network entity 110, a network entity 112, and a network entity 114, one or more of which may be communicatively coupled by one or more networks or subnetworks (subnets). For instance, any of network entity 110, network entity 112, and network entity 114 in FIG. 1 may be communicatively coupled to any other network entity via network 106 and/or subnets 108A-108N. Network entities 116 comprise the set of network entities of system 100, including but not limited to network entity 110, network entity 112, and network entity 114, as well as one or more other network entities not expressly illustrated in FIG. 1 coupled to any one or more of network 106 and/or subnets 108A-108N. As shown in FIG. 1, computing device 102 includes an activity reconstruction system 104. As described in greater detail below, activity reconstruction system 104 may be configured to reconstruct latent network activity for a particular one of network entities 116. System 100 is further described as follows.

Network 106 and subnets 108A-108N may each include one or more of any of a local area network (LAN), a wide area network (WAN), a personal area network (PAN), a combination of communication networks, such as the Internet, and/or a virtual network. Computing device 102 may be communicatively coupled to any one of network entities 116 via network 106 and/or subnets 108A-108N. In an implementation, computing device 102, network 106, subnets 108A-108N, and any one of network entities 116 may communicate via one or more application programming interfaces (API), and/or according to other interfaces and/or techniques.

Computing device 102, network 106, subnets 108A-108N, and network entities 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Network entities 116 may comprise any node of network 106 and/or subnets 108A-108N. For instance, network entities 116 may include any device or machine (physical or virtual) coupled to any of network 106 or subnets 108A-108N. In one example embodiment, network 106 and/or subnets 108A-108N may collectively comprise a network of an organization (including but not limited to a company, business, or cloud-based subscription), and network entities 116 may include a node (e.g., a physical device or machine, or a virtual node) coupled to the network. In some further example embodiments, network 106 and/or subnets 108A-108N may comprise a virtual or cloud-based network, and network entities 116 may comprise one or more virtual machines or nodes of the virtual or cloud-based network. In some other examples, any of network entities 116 may comprise a desktop computer, a portable computer, a smartphone, a tablet, a wearable computing device (e.g., a smart watch, a smart headset), a mixed and/or virtual reality device (e.g., Microsoft HoloLens™), or any other processing device. In some other example implementations, network 106 and/or subnets 108A-108N may collectively comprise a cloud-computing network and network entities 116 may be nodes coupled to the cloud-computing network. Network entities 116 are not limited to processing devices in implementations, and may include other resources on a network, such as storage devices (e.g., physical storage devices, local storage devices, cloud-based storages, hard disk drives, solid state drives, random access memory (RAM) devices, etc.), databases, etc.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

It is noted and understood that implementations are not limited to the illustrative arrangement shown in FIG. 1. Rather, an organization may comprise any number of networks, virtual networks, subnets, machines or virtual machines (or other resources) coupled in any manner. For instance, a subnet can comprise one or more additional subnets (not shown), entities can be coupled to a plurality of subnets or coupled to network 106 without a subnet, etc. Furthermore, network entities 116 and computing device 102 may be co-located, may be implemented on a single computing device or virtual machine, or may be implemented on or distributed across one or more additional computing devices or virtual machines not expressly illustrated in FIG. 1.

In some other example embodiments, computing device 102 may be implemented on one or more servers. For instance, such servers may be part of a particular organization or company associated with network 106 and/or subnets 108A-108N, or may comprise cloud-based servers configured to provide network analysis and/or monitoring services for a plurality of organizations. Computing devices 102 may include one or more of such server devices and/or other computing devices, co-located or located remote from each other. Furthermore, although FIG. 1 depicts a single computing device 102, it is understood that implementations may comprise any number of computing devices. An example computing device that may incorporate the functionality of computing device 102 is described below in reference to FIG. 8.

As described below in greater detail, activity reconstruction system 104 is configured to reconstruct the latent network activity for a particular network entity that is a weighted combination of different network usage patterns. In examples, activity reconstruction system 104 may reconstruct latent network activity for a particular network entity using monitored network activity. Monitored network activity may include, but is not limited to, a high dimensional dataset of sampled network activity that may be obtained in accordance with the IPFIX protocol, NetFlow Packet transport protocol, or any other manner of sampling network activity across a network. In some examples, a combination of different monitoring techniques may be implemented. Sampled network activity may comprise, for instance, metadata relating to packets transmitted across the network that may indicate an amount or volume of network activity between two entities. In some examples, sampled network data (e.g., in accordance with the IPFIX protocol) may include packet metadata for 1 in 4000 packets transmitted across the network, though implementations are not intended to be limited to this sampling amount.

Based on such monitoring, activity reconstruction system 104 may generate feature sets relating to each monitored entity (e.g., through aggregation or the like) and generate a model of the network activity that may be used to reconstruct latent network activity for a particular one of network entities 116. For instance, the model may be comprised of a number of vertices that describe the feature sets of each of network entities 116 in a multidimensional space, such as a convex hull. In example implementations, the number of vertices may be determined using an archetypal analysis configured to detect different usage archetypes in the ingested data based on a degree of variance between the sets of features and the number of vertices. Each of the vertices may be assigned a particular usage pattern or archetype. In other words, a convex hull that captures the ingested data (e.g., features relating to monitored network activity) may be inferred, with the usage patterns being represented by the vertices of the convex hull. Usage patterns or archetypes may include types or categories of network activity that are commonly observed on the network, such as a port scanning activity, a web crawler or indexer, a web server, a connection initiator (e.g., activity resembling a new connection), a login activity, a remote desktop protocol (RDP) activity, a denial of service attack, and/or a file transfer activity. This list is illustrative in nature, and usage patterns appreciated to those skilled in the art are also contemplated. As network features relating to a particular usage pattern (e.g. web server, crawler, port scanning, etc.) may be correlated with each other, vertices of a convex hull may be determined in a manner that captures various types of network activity associated with different usages.

Activity reconstruction system 104 may be configured to obtain features corresponding to particular network entity and reconstruct network activity for the particular entity that is a weighted combination of a plurality of the assigned usage patterns. Stated differently, the reconstruction of network activity enables a determination of how much a particular network entity's network activity is attributed to each of the different usage patterns or archetypes. In this manner, latent network activity for a particular one of network entities 116 may be determined based on sampled network data. Using such a reconstruction, enhanced network analytics may be performed that aid in improving the security of a network, anomaly detection, and/or other analytics described herein. Furthermore, as described in greater detail later, activity reconstruction system 104 may reconstruct network activity in an unsupervised manner in some implementations, enabling network monitoring and analytics to be carried without requiring the generation of ad-hoc solutions for each specific type of usage pattern or labeled data.

Figure 2:
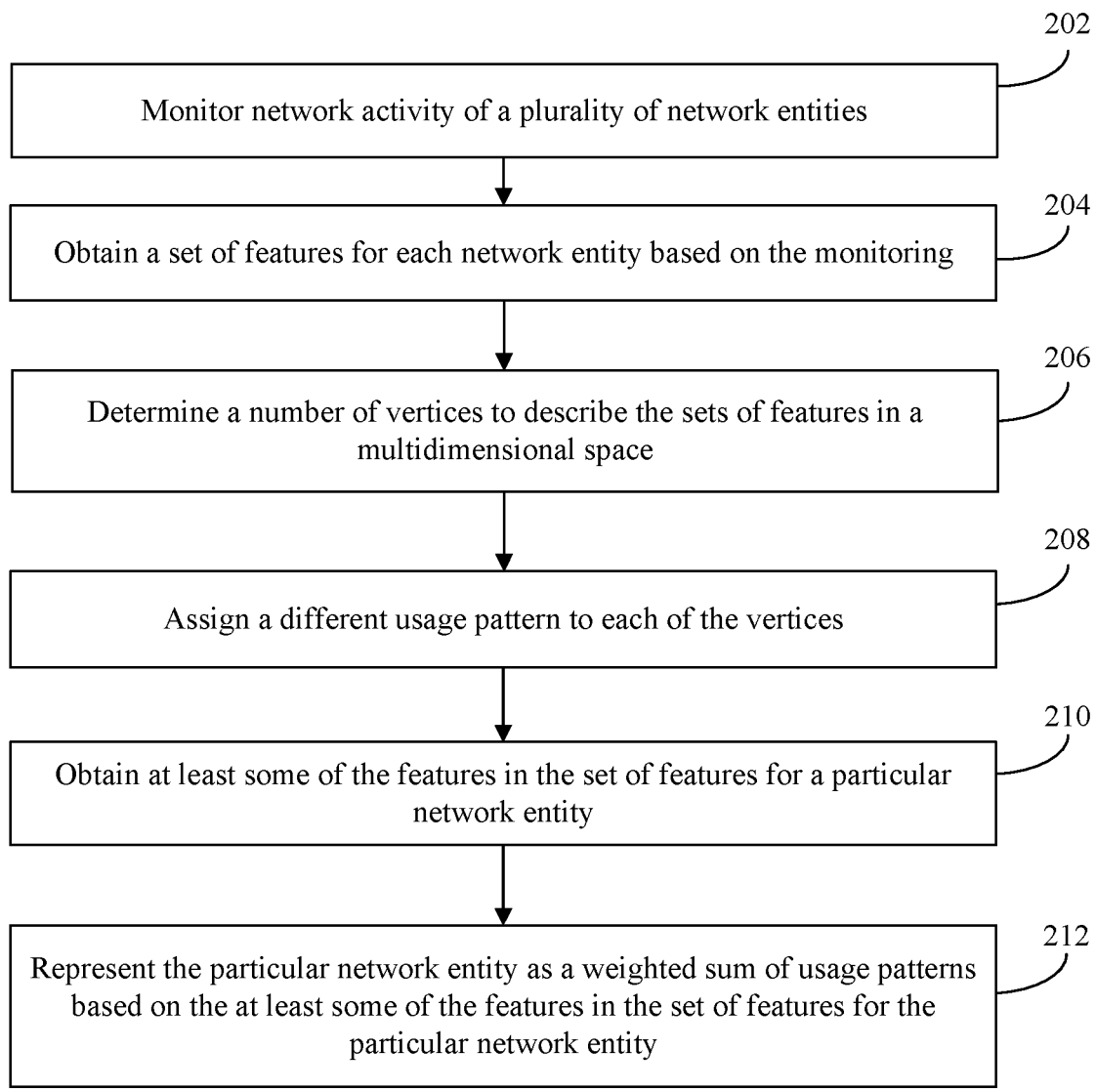
FIG. 2 shows a flowchart of a method for reconstructing network activity, according to an example embodiment.
Figure 3:
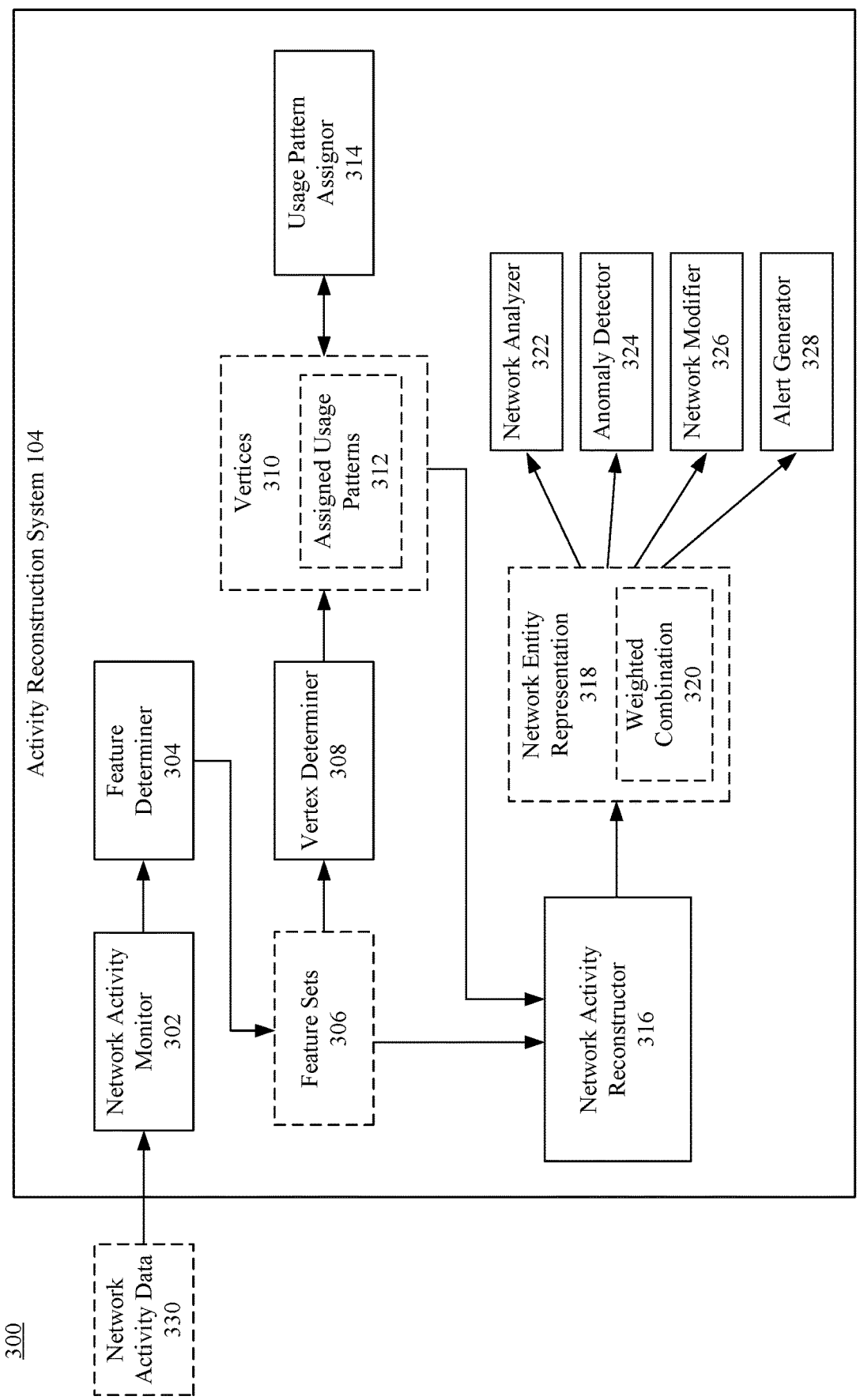
FIG. 3 shows a block diagram of an activity reconstruction system, according to an example embodiment.

Activity reconstruction system 104 may operate in various ways to reconstruct latent network activity for a network entity. For instance, activity reconstruction system 104 may operate according to FIG. 2. FIG. 2 shows a flowchart 200 of a method for reconstructing network activity, according to an example embodiment. For illustrative purposes, flowchart 200 and activity reconstruction system 104 are described as follows with respect to FIG. 3. FIG. 3 shows a block diagram of a system 300 for reconstructing latent network activity, according to an example embodiment. As shown in FIG. 3, system 300 includes one example implementation of activity reconstruction system 104. Activity reconstruction system 104 includes a network activity monitor 302 that is configured to obtain network activity data 330 relating to a plurality of network entities on a network, a feature determiner 304 configured to generate a plurality of feature sets 306 based on the monitored network activity, a vertex determiner 308, a usage pattern assignor 314, a network activity reconstructor 316, a network analyzer 322, an anomaly detector 324, a network modifier 326, and an alert generator 328. As shown in FIG. 3, vertex determiner 308 and usage pattern 314 may be configured to determine a number of vertices 310 corresponding to feature sets 306, where each vertex is assigned a different one of assigned usage patterns 312. Network activity reconstructor 316 may obtain at least some of the feature sets for a particular entity, and generate a network entity representation 318 for the particular entity that comprises a weighed combination 320 of the assigned usage patterns 312. Flowchart 200 and system 300 are described in further detail as follows.

Flowchart 200 of FIG. 2 begins with step 202. In step 202, network activity of a plurality of network entities is monitored. For instance, with reference to FIG. 3, network activity monitor 302 may be configured to obtain network activity data 330 that includes data identifying network activity that is occurring, or has occurred, on one or more networks. For instance, network activity data 330 may include data that comprises any representation of network activity for a plurality of network entities 116 on network 106 and/or subnets 108A-108N. In some example implementations, network activity data 330 may include packets (or fields extracted therefrom) or other metadata that identify or summarize network activity of network entities 116. For example, network activity data 330 may comprise metadata that indicates a sampling of network activity, such as a sampling of activity in accordance with the IPFIX protocol. In some implementations, the sampling of network activity may comprise a predetermined sample of network activity at a predetermined sampling rate (e.g., 1 in 4000 packets). Examples are not limited to any particular manner of sampling network activity for network entities 116, however, and may include other techniques known and appreciated to those skilled in the art to monitor activity of a plurality of entities communicatively coupled to a network.

In examples, network activity data 330 may include any information or metadata relating to network traffic between various network entities 116. For instance, network activity data 330 may indicate, for a particular network entity, an amount of network traffic (e.g., a volume measured in bits, bytes, or any other unit, and/or a number of transmitted or received packets) to or from another entity or entities. Network activity data 330 may also indicate, for a particular network entity, a port or port numbers associated with traffic to or from the network entity, a type of connection, an Internet Protocol (IP) address of the particular network entity and/or another network entity involved in a communication, an indication of whether a file is being transferred or downloaded, etc. In some other examples, network activity data 330 may indicate one or more Transmission Control Protocol (TCP) flags associated with network traffic of a network entity that may be configured to indicate a connection state or other related information, including but not limited to any combination of a synchronization flag (SYN), an acknowledgement flag (ACK), a finished flag (FIN), an urgent flag (URG), a push flag (PSH), a reset flag (RST), and/or any other flags.

Network activity monitor 302 may obtain network activity data 330 at any suitable or predetermined interval. For instance, network activity monitor 302 may monitor network activity for any one or more of network entities 116 each hour, every six hours, each day, etc. In some other implementations, network activity monitor 302 may obtain network activity data 330 in an ongoing or real-time fashion. Network activity monitor 302 may store monitored activity in one or more storage devices (not shown) that may be local to computing device 102, and/or in one or more storage devices that may be remotely located from computing device 102.

In step 204, a set of features is obtained for each network entity based on the monitoring. For instance, with reference to FIG. 3, feature determiner 304 may obtain the monitored network activity from network activity monitor 302, and using the monitored network activity, obtain one or more feature sets 306 for each network entity of network entities 116. In examples, feature sets 306 may include, for each network entity, one or more features relating to the monitored network activity of the network entity. For instance, feature sets 306 may include one or more features for each entity that is determined by aggregating certain types of network activity over a period of time (e.g., one hour, six hours, one day, etc.). Examples of features that may be included in feature sets 306 include a quantity of packets, a volume, a quantity of unique addresses (e.g., IP addresses), and/or a quantity of ports (e.g., unique ports, rare ports, ports not in use, etc.) based on the monitored traffic. In some further examples, features may also comprise an aggregation of traffic associated with a particular flag or combination of flags that may be included in the monitored traffic, such as of one or more SYN, ACK, FIN, URG, PSH, and/or RST flags. For instance, feature set 306 may include, for each network entity, a quantity of packets with SYN flags, a quantity of packets with ACK flags, etc. over a certain time period (e.g., one day). These examples are illustrative only, and feature determiner 304 may determine any number of N features based on the monitored network traffic using any combination of the observed traffic and over any one or more time periods.

In examples, therefore, feature determiner 304 may determine, based on the monitored traffic, a plurality of features for each of network entities 116 that may correspond to various types of network activity, such as traffic between certain addresses, physical machines, virtual machines, servers, etc. As the number of features generated increases, the accuracy of the network activity reconstruction (described later) may be enhanced. Thus, feature determiner 304 may be configured to generate features in various combinations and/or permutations such that the monitored traffic may be represented in a large number of dimensions.

In step 206, a number of vertices to describe the sets of features in a multidimensional space is determined. For instance, with continued reference to FIG. 3, vertex determiner 308 may be configured to determine a number of vertices 310 that describes feature sets 306 in a multidimensional space. In some implementations, vertex determiner 308 may implement an algorithm to determine archetypes that adequately describe the variance between feature sets 306. In other words, vertices 310 may be determined in a manner such that feature sets 306 may be adequately represented by a minimum number of usage patterns or archetypes in the ingested data.

In example implementations, vertices 310 may be determined in a manner such that the vertices define a convex hull that describes feature sets 306 in a multidimensional space. For instance, a convex hull may comprise any geometric shape or polygon, wherein vertices of the convex hull wrap or encapsulate feature sets 306. In some examples, the geometric shape or polygon may comprise a convex shape, such as a shape were all interior angles are less than 180 degrees. In some implementations, the vertices may comprise classes or categories of network activity. For examples, the vertices may represent archetypes or usage patterns derived from the plurality of feature sets 306. By determining vertices that represent usage patterns of the monitored network activity (e.g., via feature sets 306), any point within the convex hull, such as a feature set of a particular network entity, may be represented as a weighted combination of a plurality of vertices, as described later.

Vertex determiner 308 may implement one or more algorithms known and appreciated to those skilled in the art, including but not limited to Principal Convex Hull Analysis (PCHA). For instance, using a PCHA algorithm, vertex determiner 308 may determine an appropriate number of vertices 310 and estimate a principal convex hull (PCH) of feature sets 306. For instance, vertex determiner 308 may use one or more appropriate archetypal analysis algorithms, such as PCHA, to identify a plurality of K vertices, where K is a positive integer representing a suitable number of archetypes based on feature sets 306. Using an appropriate algorithm, vertex determiner 308 may thereby infer a convex hull, designated A, that comprises an N×K matrix, where N is the number of features in feature sets 306 for each network entity and K is the number of vertices 310.

It is noted and understood, however, that vertex determiner 308 is not limited to implementing a PCHA algorithm, but may implement one or more other archetypal analysis algorithms for identifying archetypes in feature sets 306 for describing the feature sets in a multidimensional space. For instance, vertex determiner 308 may comprise any algorithm or process for mapping feature sets (e.g., monitored network activity in this example) in a multidimensional space, such that any individual feature set (of a particular network entity) may be represented as a combination or mixture of different archetypes.

Vertex determiner 308 may determine vertices 310 that define a convex hull in various ways. For instance, vertex determiner 308 may define a convex hull by implementing one or more algorithms, such as a gift-wrapping algorithm (also referred to as a Jarvis march algorithm), a quick hull algorithm, a divide and conquer algorithm, a monotone chain algorithm, an incremental convex hull algorithm, Chan's algorithm, a Graham scan algorithm, or any other algorithms known and appreciated to those skilled in the relevant arts. It is also noted that implementations are not limited to vertex determiner 308 being configured to define a convex hull, but rather vertex determiner 308 may determine vertices 310 to define any other type of hull or shape that reasonably encapsulates feature sets 306. For instance, another hull or shape may be defined that encapsulates most of feature sets 306, while not encapsulating feature sets that may be deemed outliers. As a result, a hull may be defined in a manner that encloses most of the ingested data, while not being distorted by outliers in the ingested data.

In step 208, a different usage pattern is assigned to each of the vertices. For instance, with reference to FIG. 3, usage pattern assignor 314 may be configured to assign, to each of vertices 310, a different one of assigned usage patterns 312. Assigned usage patterns 312 may comprise, for example, network usage patterns that correspond to the archetypes of feature sets 306 (i.e., of the monitored network activity). In example implementations, assigned usage patterns 312 may represent classes or categories of network activity based on the ingested network traffic. Non-limiting examples of such usage patterns include a port scanning activity, a web crawler or indexer activity, a web server activity, a connection activity (e.g., a connection initiator), a login activity, a remote desktop protocol (RDP) activity, a denial of service attack, a file transfer activity, etc. This list is illustrative only, and may include any other class or category of network activity that may be observed on network 106 and/or subnets 108A-108N.

In examples, usage pattern assignor 314 may infer a usage pattern for each of vertices 310 in various ways, including through a user input and/or an automatic assignment. In some implementations, inferred usage patterns need not be defined in advance, but rather may be inferred based on the archetypes identified from feature sets 306. Additional details regarding the assignment of usage patterns to vertices will be explained in greater detail below with respect to FIG. 4.

In step 210, at least some of the features in the set of features for a particular network entity is obtained. For instance, with reference to FIG. 3, network activity reconstructor 316 may be configured to obtain at least some of the features in feature set 306 for a particular network entity among network entities 116. Network activity reconstructor 316 may obtain such features for the particular network entity for which latent network activity is to be reconstructed. For example, network activity reconstructor 316 may obtain the features for a particular computing device, virtual machine, server, etc. on network 106 and/or subnets 108A-108N. In some implementations, network activity reconstructor 316 may obtain features for a plurality of network entities, such as where latent activity is to be reconstructed for each of the plurality of entities.

In examples, the features obtained by network activity reconstructor 316 for a particular network entity may be the same features that vertex determiner 308 uses (in addition to feature sets for other network entities) to determine vertices 310. In some implementations, network activity reconstructor 316 may obtain all of the features for the particular network entity in feature sets 306, while network activity reconstructor 316 may obtain only a subset of the features in feature sets 306 for the particular network entity.

It is also noted that while network activity reconstructor 316 may obtain at least some features for a particular network entity that was also obtained by vertex determiner 308 to determine vertices 310, implementations also include network activity reconstructor 316 obtaining at least some features from a different network entity (e.g., a network entity whose features were not used by vertex determiner 308). In other words, the particular network entity need not comprise an entity that was initially monitored to determine vertices 310 in the multidimensional space, but instead may comprise a different network entity that was not part of the initial set of monitored entities. For instance, if a particular network entity was newly added to, or otherwise appears on, network 106 and/or subnets 108A-108N after vertices 310 are determined, features associated with the newly added network entity may still be obtained by network activity reconstructor 316 to reconstruct latent network activity for the newly added network entity in a similar manner as described herein by representing the newly added network entity as a weighted combination of the assigned usage types or archetypes.

In step 212, the particular network entity is represented as a weighted combination of the usage patterns based on the at least some of the features in the set of features for the particular network entity. For instance, with reference to FIG. 3, network activity reconstructor 316 may be configured to generate network entity representation 318 of the particular network entity that is a weighted combination 320 of assigned usage patterns 312 based on at least some of the features in feature set 306 for the particular network entity. For example, the feature set for a particular network entity may be represented as a single point in the multidimensional space that is located certain distances away from each of assigned usage patterns 312. Network activity reconstructor 316 may determine the distance from each of the assigned usage patterns to determine the weighted combination of assigned usage patterns that represent the point in the multidimensional space. As a result, each individual network entity (whether or not the network entity was included in an initial set of monitored network entities that was used to determine vertices 310) may be represented by a relative attribution of each usage pattern to determine the network entity's latent network usage, i.e., how a particular network entity has communicated over the network based on sampled network activity. By representing the particular network entity as weighted combination 320 that is a mixture of different assigned usage patterns 312, latent network activity for the particular network entity may be reconstructed in a more granular fashion (e.g., by reconstructing individual network usages and their weights).

In one non-limiting illustration, vertices 310 may comprise three vertices in a multidimensional space. In this example, each vertex may be assigned a different usage pattern, such as a file transfer activity, a connection activity, and a login activity. As noted earlier, such vertices (along with their assigned usage patterns) may define a convex hull, such as a hull in the shape of a triangle in this particular illustration. Each of the network entities for which network activity was monitored may be represented as a point within the triangle based on the features associated with the individual entities. Network activity reconstructor 316 may be configured to identify, for any of the features (or sets of features) for any of the individual network entities, a weighted combination of each of the assigned usage patterns that represent the latent network activity of the particular entity. In this illustration, for instance, weighed combination 320 may comprise weights that indicate that a particular network entity is represented by 50 file transfers, 100 new connections, and 10 login attempts. Alternatively, weighted combination 320 may indicate that a particular network entity is a combination of 30% (or a weight of 0.3) of a first assigned usage pattern, 45% (a weight of 0.45) of a second usage pattern, and 25% (a weight of 0.25) of a third assigned usage pattern. In this manner, latent network activity may be reconstructed for the entity. It is understood that this example is not intended to be limiting, and vertices 310 (and assigned usage patterns 312) may comprise any number of vertices (and assigned usage patterns 312) based on the monitored network activity.

Network activity reconstructor 316 may operate in various ways to determine weighted combination 320 for a particular network entity. In one example, network activity reconstructor 316 may determine weighted combination 320 by solving a non-negative least squares (NNLS) problem that identifies the weights, or relative contribution, of each of the usage patterns for a given vector in the multidimensional space. For instance, a non-negative least square problem may be represented as follows:

$$\mathrm{argmin}\_w(\|Aw-V\|),$$

where w is a K-dimensional vector (with K representing the number of vertices 310), A is a convex hull with a matrix dimension of N×K (with N representing the number of features, or dimensions), V is a vector (i.e., a vector corresponding to a set of features for a particular network entity) of length N (the number of features, or dimensions), and w represents weights associated with each of the vertices of the hull. By solving for the non-negative least squares, the respective weighted combination of each of the assigned usage patterns 312 may be determined such that a particular network entity (represented by a vector V in a multidimensional feature space) may be represented as a mixture (e.g., a weighted sum) of various usage patterns or archetypes. In other words, each weight may resemble a respective portion of a particular usage pattern that is attributed to a particular network entity. As a result, if each vertex of vertices 310 is multiplied by each respective weight for a particular network entity, the resulting combination may be the representation of the vector V in the multidimensional space (i.e., representing the feature set for the particular network entity in the space).

Network activity reconstructor 316 may determine weighted combination 320 for a particular network entity in various ways, including but not limited to implementing a PCHA algorithm described above which may be configured to solve for the respective weights of each usage pattern given a feature set for a particular network entity. However, any other manner known and appreciated to those skilled in the relevant arts may be implemented in network activity reconstructor 316 to identify a weighted combination of assigned usage patterns 312 for a particular network entity, identifying coefficients of each of the assigned usage patterns, etc.

In this manner, network activity reconstructor 316 may reconstruct the latent network activity based on identified usage patterns or archetypes for each network entity across network 106 and/or subnets 108A-108N based on each network entity's respective feature sets. Furthermore, because such a reconstruction may be carried out using sampled network data (e.g., samples of network activity obtained in accordance with an IPFIX protocol, or the like), network activity may be reconstructed without deploying agents across a network to monitor network activity, thereby conserving resources while enabling a more accurate reconstruction of network activity.

Furthermore, while alternative approaches may be utilized to attempt to identify latent network activity, such as clustering, such approaches do not enable identification of identifying a particular network entity as a weighted combination of assigned usage patterns as described herein. For instance, while alternative approaches, such as clustering (e.g., k-means or the like), enable a comparison of similar items in a dimension space using a distance metric or the like, clustering approaches do not adequately enable representing network entities as mixtures of different usages. Furthermore, clustering approaches often fail to sufficiently take into account network-related features, which are typically continuous (e.g., representing volumes of traffic). In contrast, techniques described herein adequately take into account such continuous network features when modeling the network features in a multidimensional space, and allow particular network entities to be represented as specific weighted combinations of different assigned usage patterns, or archetypes, which may enable a more realistic and accurate reconstruction of latent network activity (e.g., by identifying a particular network entity as a weighted combination of a file server and a web server).

Figure 4:
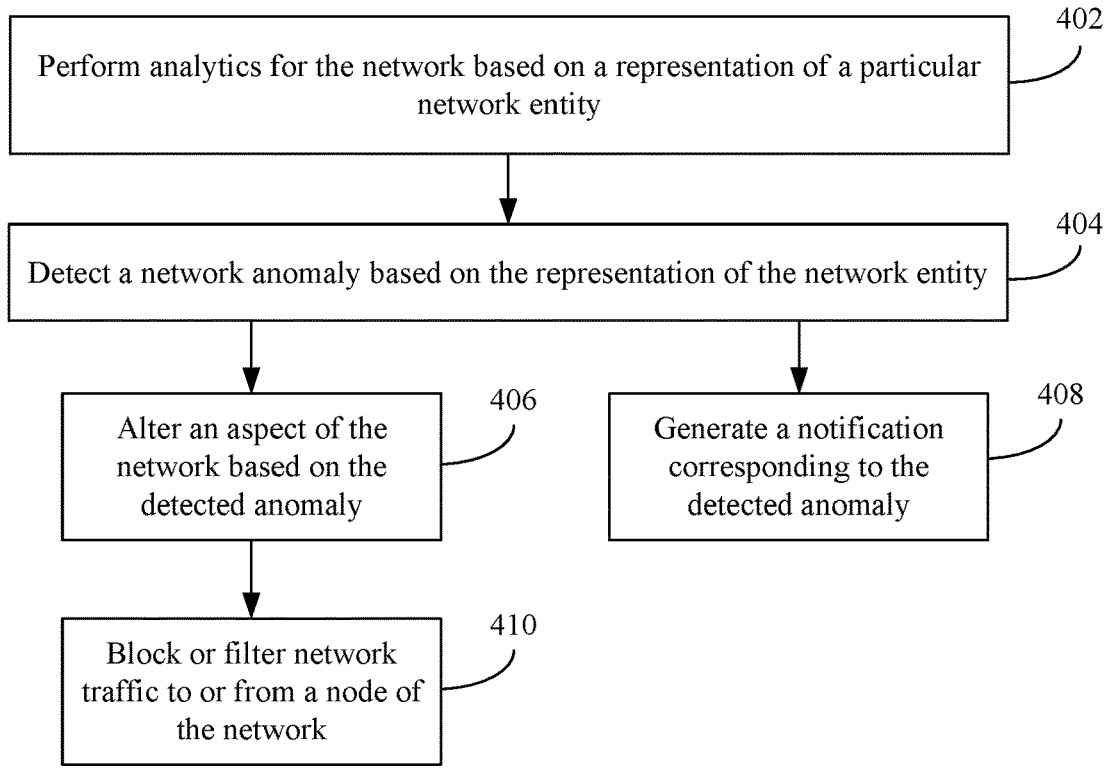
FIG. 4 shows flowchart of a method for performing actions on a network based on a representation of a network entity, according to an example embodiment.

As described above, weighted combination 320 for a particular network entity may enable various network-related actions. For example, FIG. 4 shows a flowchart 400 of a method for performing actions on a network based on a representation of a network entity, according to an example embodiment. In an implementation, the method of flowchart 400 may be implemented by network analyzer 322, anomaly detector 324, network modifier 326, and/or alert generator 328. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, analytics for the network are performed based on a representation of a particular network entity. For instance, with reference to FIG. 3, network analyzer 322 may be configured to perform one or more network analytics for any one or more of network 106 and/or subnets 108A-108M based on weighted combination 320 for a particular network entity. Network analytics may include any analysis, such as a statistical analysis, an aggregation of network usage over an extended period of time, a comparison of reconstructed network activity with other similar or dissimilar network entities, or any other analysis based on weighted combination 320.

In some examples, network analytics may include one or more analytics for general monitoring of network entities 116 and/or networks to which each of the network entities are coupled, such as monitoring that may be utilized by a network or systems administrator. In some other examples, network analyzer 322 may perform analytics for monitoring a plurality of network entities, such as a cloud-computing network, to ensure proper functioning of the network. In yet other examples, network analyzer 322 may be configured to reconstruct latent network usage that may be used as features for one or more machine-learning algorithms, such as algorithms that may enabled further analysis of network 106 and/or subnets 108A-108N, and/or classify network entities 116 based on weighed combination 320. These examples are not intended to be limiting, and may include any other types of network analysis that may be performed by reconstructing latent network usage for one or more of network entities 116.

In step 404, a network anomaly is detected based on the representation of the network entity. For instance, with reference to FIG. 3, anomaly detector 324 may detect a network anomaly in network 106 and/or subnets 108A-108N based on weighted combination 320 for a particular network entity. For example, anomaly detector 324 may determine, based on analytics performed by network analyzer 322, that one or more of network entities 116, network 106, and/or subnets 108A-108N is not performing optimally, or may be subject to a potential security threat or an actual security attack. In one example, one or more of network entities 116 may be subject to a man-in-the-middle attack, or other types of Domain Name System (DNS) spoofing attacks, where network traffic is unintentionally or unexpectedly being routed away from a particular network entity. Such an attack may be identified, for instance, by determining that a particular network entity (e.g., a web server) does not comprise an expected weight associated with certain web server usage patterns. This example is illustrative only, and any other types of network anomalies may be detected based on weighted combination 320.

In step 406, an aspect of the network may be altered based on the detected anomaly. For instance, with reference to FIG. 3, network modifier 326 may be configured to alter an aspect of one or more of network 106, subnets 108A-108N, and/or network entities 116 based on a detected anomaly. For example, network modifier 326 may perform any one or more actions that may minimize or remediate the detected anomaly, as appreciated by those skilled in the relevant arts. Such actions may be implemented automatically and/or through a suitable user interface (e.g., in response to an input from a network or systems administrator).

For instance, in step 410, network traffic to or from a node of the network may be blocked based on a detected anomaly. For example, if a particular one of network entities 116 is determined to be subject to an attack, network traffic to or from the particular network entity may be blocked. Network traffic may be blocked in its entirety or even disconnected in some examples (e.g., until further safeguards or protective measures may be implemented). In some other examples, network traffic may be blocked in a more granular fashion, such as filtering certain types of network traffic, filtering communications over certain ports, and/or filtering certain IP addresses. In this manner, network modifier 326 may be configured to alter an aspect of the network or network entities 116 to allow certain network activity to take place, while preventing other traffic that may be responsible for the detected anomaly.

In some further implementations, such as in an enterprise solution in which a network or systems administrator may remotely configure or has access to configuration or network settings of one of network entities 116 (e.g., such as remotely installing or configuring an anti-virus solution, network configuration settings, remote configuration of a network entity through a Mobile Device Management (MDM) solution, etc.), remediation actions may also include one or more remotely initiated actions. For instance, in such implementations, remediation actions may include, but are not limited to, initiating a scan, such as a virus or malware scan, of a particular network entity (such as a computing device on the network), installing remediation software (e.g., anti-virus or anti-malware packages), or any other installation or configuration of the remotely located entity such that a network anomaly may be remediated, blocking traffic, and/or filtering traffic. In some other examples, a remediation action may comprise adding a machine to a blacklist (e.g., to prevent the network entity from communicating over a network or a subnetwork over certain ports, all ports, etc.). These actions are illustrative only, and may include any other type of remediation action not expressly stated. Furthermore, any one or more of such illustrative actions could be performed automatically or be performed manually (e.g., with the aid of a network administrator that may identify such actions through a suitable interface).

Furthermore, it is also noted and understood that a node for which network traffic is blocked and/or filtered may or may not be the same as the particular network entity for which anomaly detector 324 detected a network anomaly. For example, if it has been determined that a network anomaly is the result of an attack from a particular IP address located internal or external to a network that has resulted in an anomaly for a particular network entity (e.g., a web server), network traffic to or from the IP address may be blocked in its entirety (or a subset of network traffic therefrom).

In step 408, a notification corresponding to the detected anomaly is generated. For instance, with reference to FIG. 3, alert generator 328 may be configured to generate a notification corresponding to the anomaly detected by anomaly detector 324. The notification may comprise any type of alert, such as an audio alert, a visual alert, an email, a short message service (SMS) message, a multimedia messaging service (MMS) message, a haptic alert, or any other type of alert that may be presented. For instance, such an alert may be presented in a suitable user interface accessible by a network or systems administrator responsible for overseeing and/or managing network 106 and/or subnets 108A-108N (and network entities 116 coupled thereto) that anomaly detector 324 has detected a network anomaly.

In some implementations, the alert may identify the particular network anomaly detected, the type of detected anomaly, the network entity (or entities) affected by the anomaly, a location of the detected anomaly (e.g., based on a geographic location or a network topology), an IP address of an attacker, or any other information that may be associated with the detected anomaly. Furthermore, alert generator 328 may generate a notification as an alternative to, or in conjunction with, altering an aspect of the network described with reference to step 406 of flowchart 400. For instance, in addition to generating a notification that an anomaly was detected, alert generator 328 may also be configured to indicate in the notification that one or more actions have been performed to alter an aspect of the network (e.g., blocking or filtering a node of the network) based on the detected anomaly. Furthermore, a notification may also be configured to identify any one or more network entities for which additional monitoring and/or advanced network analytics should be performed, network entities for which a remediation action should be taken, or any other related network entities that otherwise may warrant further investigation based on network analytics and/or a detected network anomaly.

Figure 5:
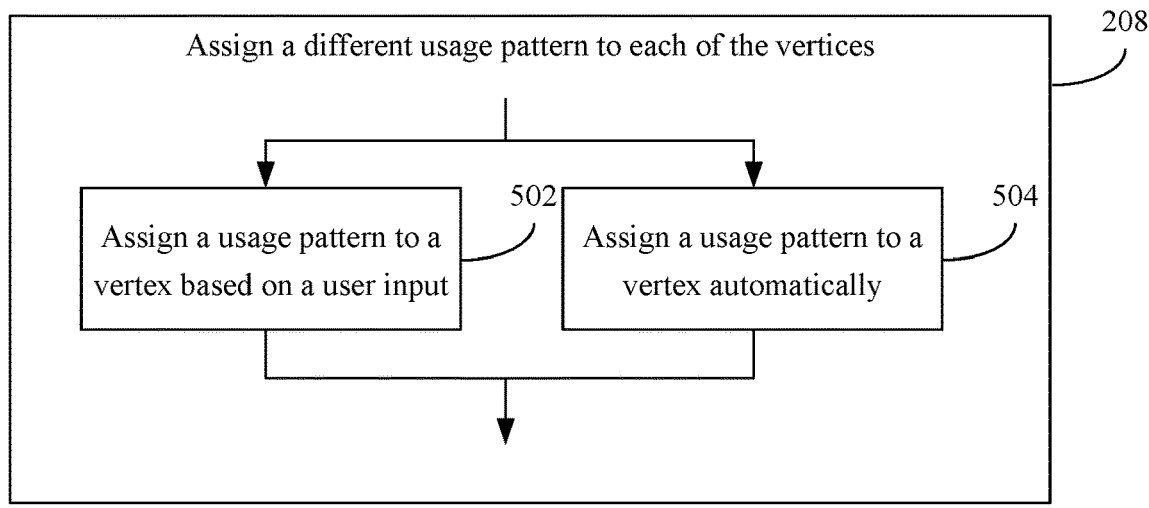
FIG. 5 shows a flowchart of a method for assigning a different usage pattern to each of a number of vertices in a multidimensional space, according to an example embodiment.

As described above, usage pattern assignor 314 may be configured to assign different usage patterns to vertices 310 in various ways. For example, FIG. 5 shows a flowchart 500 of a method for assigning a different usage pattern to each of a number of vertices in a multidimensional space, according to an example embodiment. In an implementation, the method of flowchart 500 may be implemented by usage pattern assignor 314. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a usage pattern is assigned to a vertex based on a user input. For instance, with reference to FIG. 3, usage pattern assignor 314 may be configured to assign a different one of assigned usage patterns 312 to one or more of vertices 310 based on an input received through a user interface, such as an input from a network or systems administrator that may have specialized knowledge or other domain knowledge regarding the network 106, subnets 108A-108N, and/or network entities 116. For example, usage pattern assignor 314 may be configured to identify vertices 310 and enable a selection and/or identification of an appropriate usage pattern to be assigned to each of the different one of vertices 310. In some instances, usage pattern assignor 314 may present additional information corresponding to each of the vertices, such as a listing or summary of network activity (e.g., feature sets) related to each of the vertices to enable a user to interpret the vertices. The user interface may comprise a graphical user interface (GUI) or the like of a network management and/or monitoring platform in some instances. In other implementations, the input may be received via a configuration file, a command-line interface or command language interpreter (CLI), a voice input, etc.

In step 504, a usage pattern is assigned to a vertex automatically. For instance, with reference to FIG. 3, usage pattern assignor 314 may be configured to assign a different one of assigned usage patterns 312 to one or more of vertices 310 automatically. For example, usage pattern assignor 314 may be assigned usage patterns automatically based on labelled data and/or correlation, such as labels that associate certain type of monitored network activity with certain types of network usage patterns. For instance, usage pattern assignor 314 may determine, based on a distance measure, a correlation between or more labels in a set of labeled data and one or more vertices of the multidimensional space. As an example, if certain types of nodes (e.g., nodes labeled as web servers) are close to a particular vertex, usage pattern assignor 314 may automatically infer that the vertex represents a web server usage pattern, and assign such a usage pattern accordingly. Implementations are not limited to these illustrative examples, and may include any other manner for automatically assigning usage patterns to one or more of vertices 310.

As described above, vertex determiner 308 may determine a number of vertices 310 to describe feature sets 306 in various ways. For instance, FIG. 6 shows a flowchart of a method for determining a number of vertices based on a degree of variance, according to an example embodiment. In an implementation, the method of flowchart 600 may be implemented by vertex determiner 308. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a number of vertices is determined based, at least in part, on a degree of variance between the sets of features and the number of vertices. For instance, with reference to FIG. 3, vertex determiner 308 may be configured to determine a number of vertices 310 suitable for describing feature sets 306 based on a degree of variance between feature sets 306 and a number of vertices. A degree of variance, as used herein, may refer to a degree or a percentage by which variances in ingested feature sets may be explained. For example, while an increase in the number of vertices typically leads to an increase in a degree of variance, the increase may not be linear in some implementations. Rather, increasing the number of vertices beyond a certain point may result in a marginal increase in the degree of variance. In examples, therefore, vertex determiner 308 may be configured to determine a minimum number of vertices 310 that adequately explains feature sets 306.

Vertex determiner 308 may determine a number of vertices based on a degree of variance in various ways. One such example includes implementation of a PCHA algorithm and/or an elbow or knee criteria of determining a minimum number of vertices 310 sufficient to explain feature sets 306, through which the appropriate number of vertices K may be selected in a manner that adequately explains the variance of feature sets 306, and where the ability to explain additional variances in the data reduces substantially with each additional vertex beyond the selected number. In other words, vector determiner 308 may select an optimal number of vertices that may enable sufficient explanation of variance between feature sets until the point where additional vertices offer relatively little additional gain. By selecting a minimum number of vertices K that adequately explains the variance of feature sets 306, a convex hull (or any other type of hull) may be defined in a manner that includes a polygon with a minimum number of sides. Furthermore, since the number of vertices 310 is based on a degree of variance between feature sets 306 and the number of vertices, any appropriate number of vertices 310 (and therefore usage patterns) may be selected, ranging from a few vertices to a relatively large number of vertices based on a desired variance. As a result, any number of usage patterns may be assigned, even large numbers, enabling latent network activity reconstruction to be determined with greater granularity.

Although example embodiments are described herein as implementing an elbow or knee method, other techniques may also be implemented for determining an appropriate number of vertices given a set of features. For instance, vertex determiner 308 may implement other techniques, such as a silhouette method (or an average silhouette method), X-means clustering, information criterion approach, information-theoretic approach, cross-validation, a kernel matrix analysis, a gap statistic method, or any other techniques appreciated by those skilled in the relevant arts.

In some example implementations, network activity reconstructor 316 may be configured to obtain previously assigned usage patterns for a network. For example, FIG. 7 shows a flowchart 700 of a method for obtaining a set of usage patterns for a network, according to an example embodiment. In an implementation, the method of flowchart 700 may be implemented by network activity reconstructor 316. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a set of usage patterns for a network is obtained that describes sets of features for each of a plurality of network entities, each usage pattern in the set of usage patterns corresponding to a different vertex in a multidimensional space. For example, with reference to FIG. 7, network activity reconstructor 316 may be configured to obtain assigned usage patterns 312 for a network, such as network 106, and/or subnets 108A-108N. In this example, each usage pattern in the set of assigned usage patterns 312 may correspond to a different vertex (e.g., one of vertices 310) in a dimensional space. The determination of vertices 310 in a multidimensional space may be carried out in a similar manner as described herein, or in any other suitable manner.

In this manner, a computing device (such as a management console) may be configured to obtain assigned usage patterns 312 that feature sets 306 for a given network, and may utilize the obtained usage patterns to reconstruct network activity for a particular network entity in a similar manner as described previously. In other words, example embodiments include enabling one computing platform, such as a server or a set of servers, to identify vertices 310 and associate usage patterns with each of the vertices, while a separate console may obtain the assigned usage patterns for the network to reconstruct network usage for any one or more of network entities 116.

III. Example Mobile and Stationary Device Embodiments

Computing device 102, activity reconstruction system 104, network entities 116, network activity monitor 302, feature determiner 304, vertex determiner 308, usage pattern assignor 314, network activity reconstructor 316, network analyzer 322, anomaly detector 324, network modifier 326, alert generator 328, flowchart 200, flowchart 400, flowchart 500, flowchart 600, and/or flowchart 700 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, activity reconstruction system 104, network entities 116, network activity monitor 302, feature determiner 304, vertex determiner 308, usage pattern assignor 314, network activity reconstructor 316, network analyzer 322, anomaly detector 324, network modifier 326, alert generator 328, flowchart 200, flowchart 400, flowchart 500, flowchart 600, and/or flowchart 700 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
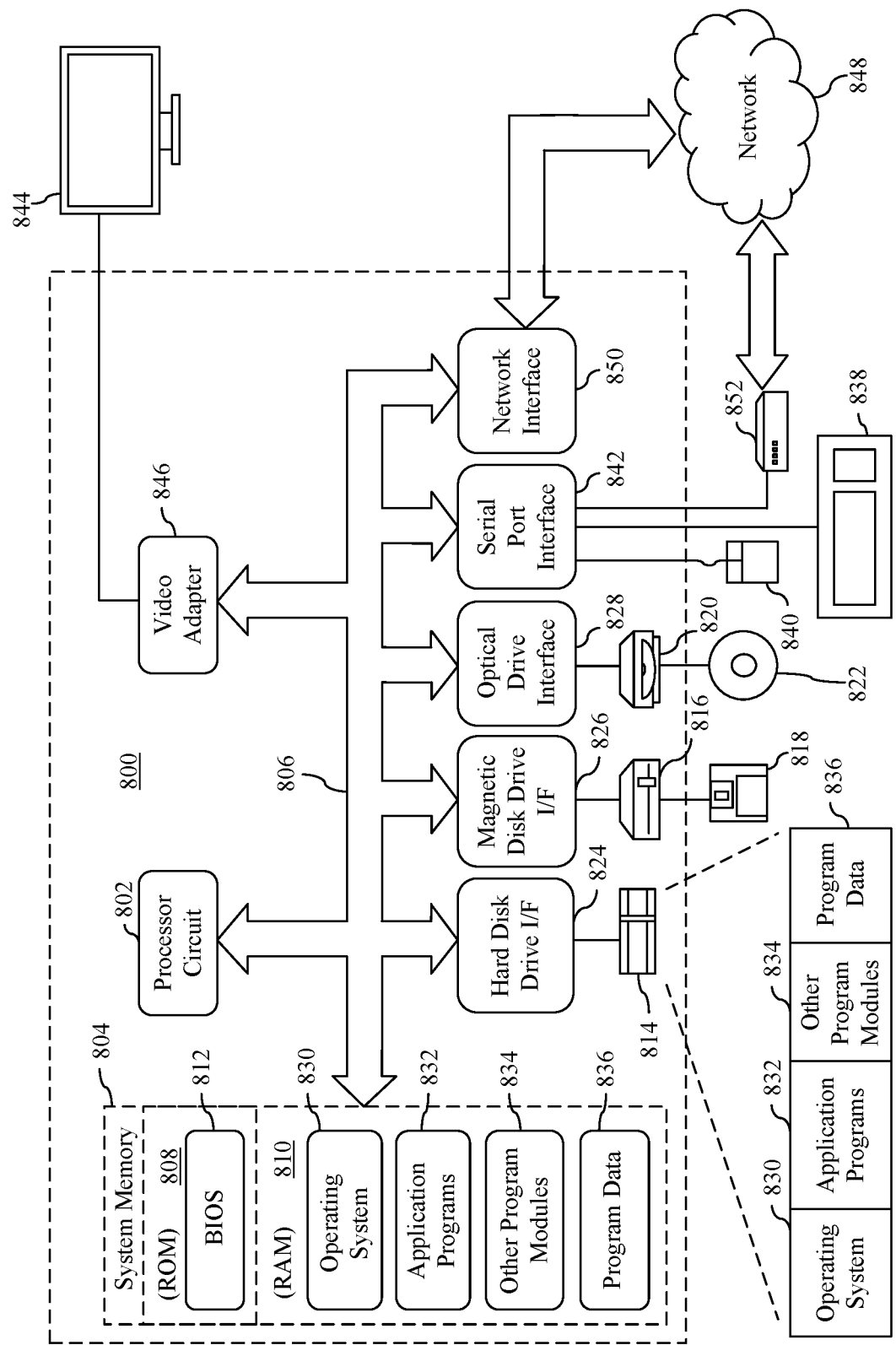
FIG. 8 shows a block diagram of an example computing device that may be used to implement example embodiments.

FIG. 8 depicts an exemplary implementation of a computing device 800 in which example embodiments may be implemented. For example, any of computing device 102, activity reconstruction system 104, network entities 116, network activity monitor 302, feature determiner 304, vertex determiner 308, usage pattern assignor 314, network activity reconstructor 316, network analyzer 322, anomaly detector 324, network modifier 326, and/or alert generator 328 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Example embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing computing device 102, activity reconstruction system 104, network entities 116, network activity monitor 302, feature determiner 304, vertex determiner 308, usage pattern assignor 314, network activity reconstructor 316, network analyzer 322, anomaly detector 324, network modifier 326, alert generator 328, flowchart 200, flowchart 400, flowchart 500, flowchart 600, and/or flowchart 700 (including any suitable step of flowcharts 200, 400, 500, 600, or 700) and/or further example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for reconstructing network activity is described herein. The system includes: one or more processors; and one or more memory devices that store program code configured to be executed by the one or more processors, the program code comprising: a network activity monitor configured to monitor network activity of a plurality of network entities; a feature determiner configured to obtain a set of features for each network entity in the plurality of network entities based on the monitoring; a vertex determiner configured to determine a number of vertices to describe the sets of features in a multidimensional space; a usage pattern assignor configured to assign a different usage pattern to each of the vertices; a network activity reconstructor configured to obtain at least some of the features in the set of features for a particular network entity, and to represent the particular network entity as a weighted combination of the usage patterns based on the at least some of the features in the set of features for the particular network entity; and a network modifier configured to alter at least one aspect of the network based at least on the representation of the particular network entity.

In one implementation of the foregoing system, at least one feature in the set of features for each network entity in the plurality of network entities is determined by aggregating a certain type of network activity over a period of time.

In another implementation of the foregoing system, the usage pattern assignor is configured to assign the different usage patterns to the vertices based on user input.

In another implementation of the foregoing system, the usage pattern assignor is configured to automatically assign the different usage patterns to the vertices.

In another implementation of the foregoing system, the vertices define a convex hull that describes the sets of features in the multidimensional space.

In another implementation of the foregoing system, the different usage patterns assigned to the vertices include one or more of: a port scanning activity; a web crawler or indexer; a web server; a connection initiator; a login activity; a remote desktop protocol activity; a denial of service attack; or a file transfer activity.

In another implementation of the foregoing system, the number of vertices is determined based, at least in part, on a degree of variance between the sets of features and the number of vertices.

In another implementation of the foregoing system, the network modifier is configured to alter the at least one aspect of the network by at least one of: blocking network traffic to or from a node of the network; or filtering network traffic to or from the node.

A computer-readable memory is described herein. The computer-readable memory has program code recorded thereon that when executed by at least one processor causes the at least one processor to perform a method comprising: monitoring network activity of a plurality of network entities; obtaining a set of features for each network entity in the plurality of network entities based on the monitoring; determining a number of vertices to describe the sets of features in a multidimensional space; assigning a different usage pattern to each of the vertices; obtaining at least some of the features in the set of features for a particular network entity; representing the particular network entity as a weighted combination of the usage patterns based on the at least some of the features in the set of features for the particular network entity; and detecting a network anomaly based at least on the representation of the particular network entity.

In one implementation of the foregoing computer-readable memory, the assigning the different usage patterns to the vertices comprises automatically assigning the different usage patterns to the vertices.

In another implementation of the foregoing computer-readable memory, the vertices define a convex hull that describes the sets of features in the multidimensional space.

In another implementation of the foregoing computer-readable memory, the different usage patterns assigned to the vertices includes one or more of: a port scanning activity; a web crawler or indexer; a web server; a connection initiator; a login activity; a remote desktop protocol activity; a denial of service attack; or a file transfer activity.

In another implementation of the foregoing computer-readable memory, the number of vertices is determined based, at least in part, on a degree of variance between the sets of features and the number of vertices.

In another implementation of the foregoing computer-readable memory, the method further comprises: performing an action based, at least in part, on the detected network anomaly, the action including one or more of: blocking network traffic to or from a node of the network; filtering network traffic to or from the node; or generating a notification corresponding to the detected anomaly.

A method of reconstructing network activity is described herein. The method includes: obtaining a set of usage patterns for a network that describes sets of features for each of a plurality of network entities, each usage pattern in the set of usage patterns corresponding to a different vertex in a multidimensional space; obtaining at least some of the features in the set of features for a particular network entity; and representing the particular network entity as a weighted combination of the usage patterns based on the at least some of the features in the set of features for the particular network entity.

In one implementation of the foregoing method, the method further comprises: performing analytics for the network based at least on the representation of the particular network entity.

In another implementation of the foregoing method, the method further comprises: detecting a network anomaly based at least on the performed analytics.

In another implementation of the foregoing method, the method further comprises: performing an action based at least on the detected network anomaly, the action including one or more of: altering at least one aspect of the network; or generating a notification corresponding to the detected anomaly.

In another implementation of the foregoing method, the set of usage patterns define a convex hull that describes the sets of features in the multidimensional space.

In another implementation of the foregoing method, the set of usage patterns includes one or more of: a port scanning activity; a web crawler or indexer; a web server; a connection initiator; a login activity; a remote desktop protocol activity; a denial of service attack; or a file transfer activity.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for reconstructing network activity, the system comprising:
   one or more processors; and
   one or more memory devices that store program code configured to be executed by the one or more processors, the program code comprising:
      a network activity monitor configured to monitor network activity of a plurality of network entities;
      a feature determiner configured to obtain a set of features for each network entity in the plurality of network entities based on the monitoring;
      a vertex determiner configured to determine a number of vertices to describe the sets of features in a multidimensional space;
      a usage pattern assignor configured to assign a different usage pattern to each of the vertices, wherein the usage pattern assignor automatically assigns the different usage patterns to the vertices or assigns the different usage patterns to the vertices based on a user input; and
      a network activity reconstructor configured to obtain at least a subset of the features in the set of features for a particular network entity, and to represent the particular network entity based at least on the usage patterns and the subset of the features in the set of features for the particular network entity.

2. The system of claim 1, wherein at least one feature in the set of features for each network entity in the plurality of network entities is determined by aggregating a type of network activity over a period of time.

3. The system of claim 1, wherein the vertices define a convex hull that describes the sets of features in the multidimensional space.

4. The system of claim 1, wherein the different usage patterns assigned to the vertices include one or more of:
   a port scanning activity;
   a web crawler or indexer;
   a web server;
   a connection initiator;
   a login activity;
   a remote desktop protocol activity;
   a denial of service attack; or
   a file transfer activity.

5. The system of claim 1, wherein the number of vertices is determined based, at least in part, on a degree of variance between the sets of features and the number of vertices.

6. The system of claim 1, further comprising a network modifier configured to:
   alter at least one aspect of the network based at least on the representation of the particular network entity by at least one of:
   blocking network traffic to or from a node of the network; or
   filtering network traffic to or from the node.

7. The system of claim 1, wherein the network activity reconstructor is configured to represent the particular network entity as a combination of a plurality of the usage patterns.

8. The system of claim 1, wherein the monitored network activity of the plurality of network entities comprises a sampling of network data.

9. A system for reconstructing network activity, the system comprising:
   one or more processors; and
   one or more memory devices that store program code configured to be executed by the one or more processors, the program code comprising:
      a feature determiner configured to obtain a set of usage patterns for a network that describes sets of features for each of a plurality of network entities, each usage pattern in the set of usage patterns corresponding to a different vertex in a multidimensional space; and
      a network activity reconstructor configured to:
         obtain at least a subset of the features in the set of features for a particular network entity, and
         represent the particular network entity as a weighted combination of the usage patterns based on the at least the subset of the features in the set of features for the particular network entity.

10. The system of claim 9, further comprising a network analyzer configured to perform analytics for the network based at least on the representation of the particular network entity.

11. The system of claim 10, further comprising a network modifier configured to detect a network anomaly based at least on the performed analytics.

12. The system of claim 11, wherein the network modifier is further configured to:
   perform an action based at least on the detected network anomaly, the action including one or more of:
      altering at least one aspect of the network; or
      generating a notification corresponding to the detected anomaly.

13. The system of claim 9, wherein the set of usage patterns define a convex hull that describes the sets of features in the multidimensional space.

14. The system of claim 9, wherein the set of usage patterns includes one or more of:
   a port scanning activity;
   a web crawler or indexer;
   a web server;
   a connection initiator;
   a login activity;
   a remote desktop protocol activity;
   a denial of service attack; or a file transfer activity.

15. A computer-readable memory device having program code recorded thereon that when executed by at least one processor causes the at least one processor to perform a method comprising:
- obtaining a set of usage patterns for a network that describes sets of features for each of a plurality of network entities, each usage pattern in the set of usage patterns corresponding to a different vertex in a multidimensional space;
- obtaining at least a subset of the features in the set of features for a particular network entity; and
- representing the particular network entity as a weighted combination of the usage patterns based on the at least the subset of the features in the set of features for the particular network entity.

16. The computer-readable memory device of claim 15, wherein the method further comprises:
- performing analytics for the network based at least on the representation of the particular network entity.

17. The computer-readable memory device of claim 16, wherein the method further comprises:
- detecting a network anomaly based at least on the performed analytics.

18. The computer-readable memory device of claim 17, wherein the method further comprises:
- performing an action based at least on the detected network anomaly, the action including one or more of:
  altering at least one aspect of the network; or
  generating a notification corresponding to the detected anomaly.

19. The computer-readable memory device of claim 15, wherein the set of usage patterns define a convex hull that describes the sets of features in the multidimensional space.

20. The computer-readable memory device of claim 15, wherein the set of usage patterns includes one or more of:
- a port scanning activity;
- a web crawler or indexer;
- a web server;
- a connection initiator;
- a login activity;
- a remote desktop protocol activity;
- a denial of service attack; or
- a file transfer activity.

* * * * *